United States Patent [19]

Mochizuki

[11] 4,249,086
[45] Feb. 3, 1981

[54] VEHICULAR SIDE MIRROR CONTROL

[75] Inventor: Asaji Mochizuki, Kawasaki, Japan

[73] Assignee: Showa Musen Kogyo Kabushiki Kaisha, Tokyo, Japan

[21] Appl. No.: 274

[22] Filed: Jan. 2, 1979

[30] Foreign Application Priority Data

Nov. 2, 1978 [JP] Japan .................. 53/150332[U]

[51] Int. Cl.³ .................................... G02B 5/08
[52] U.S. Cl. .................. 307/10 R; 200/5 A; 200/159 A; 318/280; 350/289
[58] Field of Search .............. 307/10 R, 9; 350/289; 318/280; 200/5 A, 1 V, 16 A, 159 R, 159 A

[56] References Cited

U.S. PATENT DOCUMENTS

| 3,243,680 | 3/1966 | Burns | 318/280 X |
|-----------|--------|-------|-----------|
| 3,253,092 | 5/1966 | Landow | 200/16 A |
| 3,788,734 | 1/1974 | McDuffee, Sr. | 350/289 |
| 4,104,702 | 8/1978 | Armstrong | 200/5 A X |

FOREIGN PATENT DOCUMENTS 590700 2/1978 U.S.S.R. .................. 318/280

*Primary Examiner*—Michael L. Gellner
*Assistant Examiner*—James L. Dwyer
*Attorney, Agent, or Firm*—Oblon, Fisher, Spivak, McClelland & Maier

[57] ABSTRACT

A vehicular side mirror control which includes a casing, a motor unit incorporated in the casing and including a first motor adapted to rotate a vehicular side mirror in a first direction and a second motor adapted to rotate said side mirror in a second direction intersecting the first direction at right angles, two first switches associated with the first motor for driving the first motor in one direction and the other direction, respectively and two second switches associated with the second motor for driving the second motor in one direction and the other direction, respectively, such switches being in the form of a push button-operated switch.

3 Claims, 10 Drawing Figures

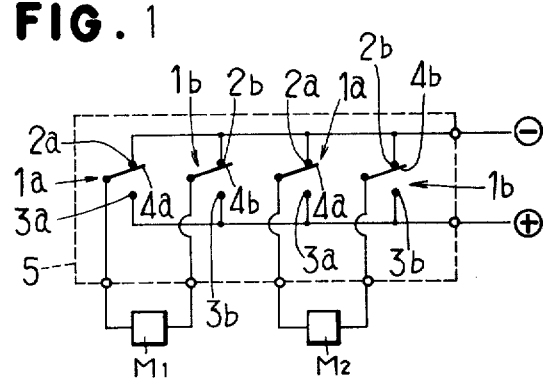
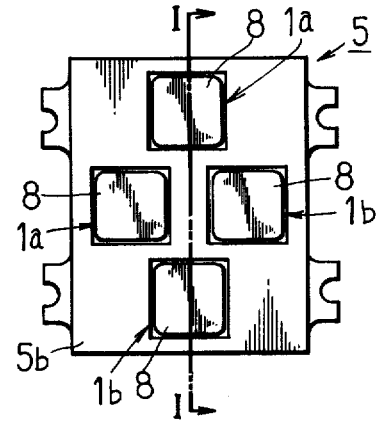
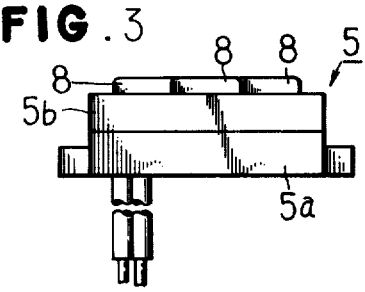
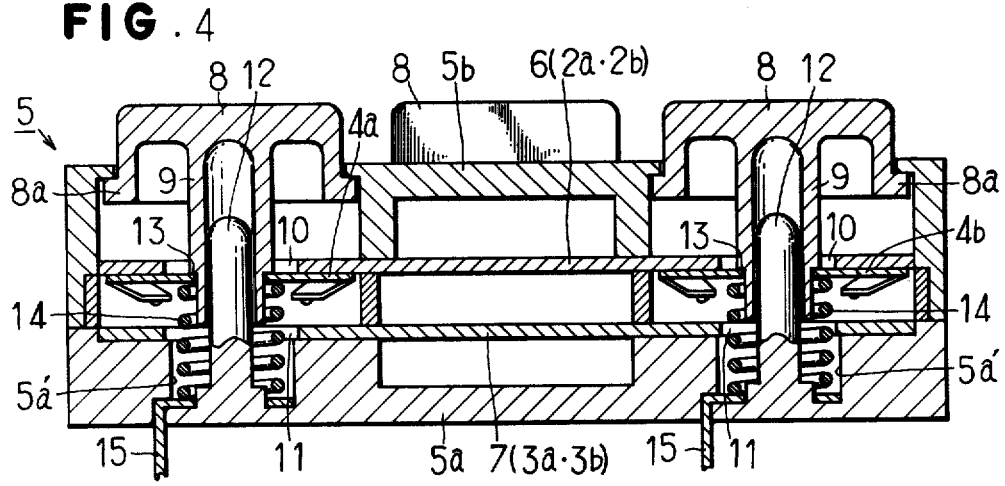
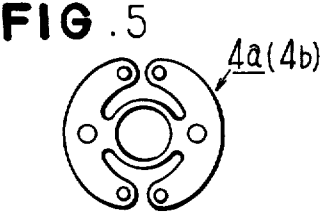
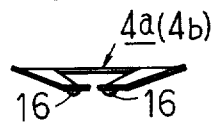

VEHICULAR SIDE MIRROR CONTROL

BACKGROUND OF THE INVENTION

1. Field of the Invention

This invention relates to a vehicular side mirror control and more particularly, to a vehicular side mirror control for remotely controlling the angular position of a vehicular side mirror with respect to the vertical and horizon.

2. Description of the Prior Art

A variety of vehicular side mirror controls of the above type have been proposed and practically employed and in any one of the prior art vehicular side mirror controls, two drive motors have been employed as the drive sources for rotating the vehicular side mirror in the vertical direction and horizontal direction, respectively so as to vary the angular position of the side mirror with a multi-directional switch having a single lever being electrically connected to the common electric circuit of the drive motors whereby when the lever is tilted in any selected one of four directions, the rotational direction of the motors is changed over from the forward rotational direction to the reverse rotational direction and vice versa so as to vary the angular position of the side mirror with respect to vertical or horizontal.

However, although the prior art side mirror control of the above type has excellent manipulation ability, the multi-directional switch employed in such a conventional vehicular side mirror control has a complicated construction and is expensive. In addition, the multi-directional switch in the prior art vehicular side mirror control is vulnerable to damage and, since the switch lever extends to a position adjacent to the meter within the automobile, it has been frequently experienced that the driver touches the meter unintentionally. In order to prevent such unintentional touching of the meter by the driver, the switch lever is required to be positioned in a strictly limited position within the automobile. Furthermore, the presence of the switch lever in the vicinity of the meter is not advisable from the view point of safety when the automobile collides against another automobile or any other object.

SUMMARY OF THE INVENTION

One of the principal features of the present invention is to provide a vehicular side mirror control which comprises two drive sources adapted to rotate a vehicular side mirror in the vertical direction and horizontal direction, respectively, forward and reverse drive electric circuits for each of said drive sources, a forward drive switch in said forward drive electric circuit for rotating each of said drive sources, and a reverse drive switch in said reverse drive electric circuit for rotating each of said drive sources, said switches being in the form of a push button-operated switch and each comprising opposed and spaced positive and negative electrode means, a movable contact piece disposed between said positive and negative electrode means normally in contact with one of said electrode means and adapted to contact the other electrode means when the associated switch is actuated, said movable contact piece being connected to either terminal of the associated drive source, a spring normally urging the associated movable contact piece so as to contact said one electrode means and a push button normally urging said movable contact piece against said one electrode means and adapted to separate the associated movable contact piece from said one electrode means to cause the movable contact piece to contact the other electrode means when the associated switch is actuated.

Another one of the principal features of the present invention is to provide a vehicular side mirror control which comprises two drive sources, forward and reverse electric circuits for each of said drive sources, a forward drive switch in said forward drive electric circuit for rotating each of said drive sources in the forward direction, a reverse drive switch in said reverse drive electric circuit for rotating each of said drive sources in the reverse direction, said switches being in the form of a push button-operated switch and each comprising a first pair of stationary contacts printed on one surface of a printed circuit board, a second pair of stationary contacts printed on the other surface of said printed circuit board, a first movable contact piece disposed between said first pair of stationary contacts, a second movable contact piece disposed between said second pair of stationary contacts and normally in contact with the contacts, a spring normally urging said second movable contact piece to contact the second pair of stationary contacts and a push button adapted to separate said second movable contact piece from said second pair of stationary contacts and, at the same time, cause said first movable contact piece to contact said first pair of stationary contacts when the associated switch is actuated and including a depending shank which extends through said printed circuit board and to which said first and second movable contact pieces are secured.

One object of the present invention is to provide a novel and improved vehicular side mirror control which can effectively eliminate the disadvantages inherent in the conventional vehicular side mirror controls.

Another object of the present invention is to provide a vehicular side mirror control in which operational switches in the form of a push button-operated switch are employed to thereby simplify the construction of the control and reduce the production cost of the control.

Another object of the present invention is to provide a trouble-free vehicular side mirror control in which operational switches in the form of a push button-operated switch are employed and the push buttons of the switches are disposed so as to expose the heads of the push buttons on the top of the casing which houses the various components of the control whereby the construction and operation of the control are made simpler than those of the prior art vehicular side mirrors.

A still further object of the present invention is to provide a vehicular side mirror control in which, since the operation switches in the form of a push button-operated switch are employed, a small size cap can be employed for covering the operational components of the control, the control can be selectively installed on the upper surfaces of arm rests, the inner surfaces of doors or in the vicinity of the meter within the automobile and in addition, the control can be simply installed and protected against inadvertent touch by the driver or contact with spilled drinks and water to thereby enhance the safety characteristics of the control.

The above and other objects and attendant advantages of the present invention will be more readily apparent to those skilled in the art from a reading of the following detailed description in conjunction with the accompanying drawings which show preferred embodiments of the present invention for illustration purpose only, but not for limiting the scope of the same in any way.

BRIEF DESCRIPTION OF THE DRAWINGS

FIGS. 1 through 6 inclusive show a first embodiment of the vehicular side mirror control constructed in accordance with the present invention in which:

FIG. 1 is a schematic view of the electric circuit of said vehicular side mirror control;

FIG. 2 is a top plan view of the switch arrangement in said electric circuit;

FIG. 3 is a side elevational view of said switch arrangement as shown in FIG. 2;

FIG. 4 is a cross-sectional view on an enlarged scale taken along substantially the line I—I of FIG. 2;

FIG. 5 is a top plan view of one of the movable contact pieces as shown in FIG. 4; and FIG. 6 is a front elevational view of said movable contact piece as shown in FIG. 5; and FIGS. 7 through 10 inclusive show a second embodiment of the vehicular side mirror control constructed in accordance with the present invention in which;

FIG. 7 is a schematic view of the electric circuit of said second embodiment of the vehicular side mirror control;

FIG. 8 is a cross-sectional view on an enlarged scale of the switch arrangement in the electric circuit as shown in FIG. 7;

FIG. 9 is a top plan view on a reduced scale of the printed circuit board as shown in FIG. 8; and FIG. 10 is a bottom view of said printed circuit board as shown in FIG. 9.

DETAILED DESCRIPTION OF THE PREFERRED EMBODIMENTS

Figure 7:
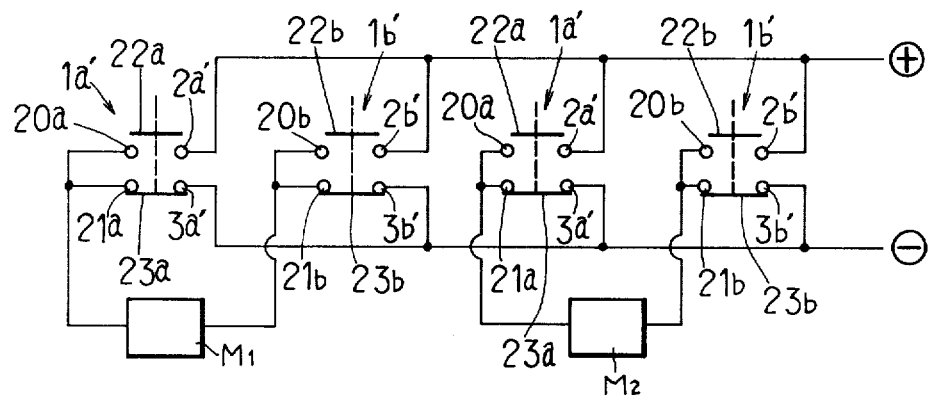

The present invention will be now described referring to the accompanying drawings and more particularly, to FIGS. 1 through 6 inclusive in which the first embodiment of the vehicular side mirror control of the present invention is shown. However, the embodiments of the invention are described in detail, it should be understood that although the description will be made of the invention in connection with one of the vehicular side mirrors, the invention is also equally applicable to the other vehicular side mirror. In the electric circuit as shown in FIG. 1, reference characters M1 and M2 denote drive motors or drive sources adapted to drive the associated vehicular side mirror (not shown) in the vertical direction and horizontal direction, respectively, wherein reference numeral 1a denotes the switches adapted to be actuated when the motors are to be rotated in the forward direction and reference numeral 1b denotes the switches adapted to be actuated when the motors are to be rotated in the reverse direction.

For the purpose of description of the present invention, it is assumed that the motor M1 is connected to the vertical shaft of the associated side mirror to rotate the side mirror in the vertical direction and the motor M2 is connected to the horizontal shaft of the same side mirror to rotate the side mirror in the horizontal direction, respectively. The first embodiment comprises the components connected together in the circuit as shown in FIG. 1.

Each of the switches 1a comprises a stationary contact 2a connected to the negative side of the common power source (not shown), a stationary contact 3a connected to the positive side of the power source and a movable contact piece 4a normally in contact with the stationary contact 2a and adapted to contact the stationary contact 3a when the switch 1a is actuated in the manner as will be described hereinafter. Similarly, each of the switches 1b comprises a stationary contact 2b connected to the negative side of the common power source, a stationary contact 3b connected to the positive side of the power source and a movable contact piece 4b normally in contact with the stationary contact 2b and adapted to contact the stationary contact 3b when the switch 1b is actuated in the manner as will be described hereinafter. The movable contact piece 4a is connected to one terminal of the motor M1 (or M2) and the movable contact piece 4b is connected to the opposite terminal of the motor M1 (or M2).

When the forward drive switch 1a is actuated to shift the movable contact piece 4a from the stationary contact 2a with which the movable contact piece is normally in contact to the other stationary contact 3a, the motor forward drive circuit comprising the positive side of the power source, the forward drive switch 1a, the motor M1 (or M2), the reverse drive switch 1b and the negative side of the power source is established to thereby rotate the motor M1 (or M2) in the forward direction. Similarly, when the reverse rotation switch 1b is actuated to shift the movable contact piece 4b from the stationary contact 2b with which the movable contact piece 4b is normally in contact to the other stationary contact 3b, the motor reverse drive circuit comprising the positive side of the power source, the reverse drive switch 1b, the motor M1 (or M2), the forward drive switch 1a and the negative side of the power source is established to thereby rotate the motor M1 (or M2) in the reverse direction.

When the motors M1 and M2 are rotated in the forward and reverse directions in the manner mentioned above, the vertical and horizontal shafts of the side mirror which mount the mirror on the automobile are rotated in the vertical and horizontal directions, respectively, to thereby vary the angle of the side mirror with respect to the vertical and horizon, respectively.

The forward and reverse drive switches 1a, 1a and 1b, 1b are incorporated into a single casing 5 in the arrangement as shown in FIG. 2. The stationary contacts 2a, 2a and 2b, 2b of all the forward and reverse drive switches 1a, 1a and 1b, 1b which are connected to the negative side of the power source are formed on a single common cathode electrode plate 6 and the other stationary contacts 3a, 3a and 3b, 3b of these switches are formed on a single common anode electrode plate 7. The two electrodes 6 and 7 extend in the longitudinal direction in and secured to the interior of the casing 5 in parallel and spaced relationship to each other with the cathode electrode plate 6 positioned above the anode electrode plate 7. The above-mentioned movable contact pieces 4a, 4a and 4b, 4b are disposed between the cathode and anode electrode plates 6 and 7 in spaced relation to each other in the longitudinal direction of these electrode plates and are adapted to be operated by their associated spring-loaded push buttons 8, 8 . . . which are positioned on the top of the casing 5 and description of which will be made hereinafter.

As more clearly shown in FIG. 4, the casing 5 has a rectangular box shape and comprises a base member 5a and a cover member 5b positioned on the top of the base member 5a. The cover member 5b is provided with a plurality of bores (four bores in the illustrated embodiment) in which the spring-loaded push buttons 8, 8 . . . are received with the heads projecting above the cover member 5b. Each of the push buttons 8, 8 . . . is provided in the periphery with an outwardly extending flange 8a so that the push button is prevented from slipping out of the cover member 5b. Each of the push buttons 8, 8 . . . also has a center hollow shank 9 depending from the inner or under surface of the push button head and extending through the corresponding aligned bores 10 and 11 formed in the cathode and anode electrode plates 6 and 7, respectively to slidably fit on the corresponding guide projection 12 extending uprightly from the upper surface of the base member 5a. The hollow shank 9 of each of the push buttons 8, 8 . . . is reduced in diameter in the portion thereof positioned between the two electrode plates 6 and 7 so as to provide a shoulder 13 on which the associated movable contact piece 4a (or 4b) is mounted. The upper surface of the base member 5a is formed with a plurality of spaced recesses 5a', 5a' . . . each surrounding the base of the associated guide projection 12. A spring 14 is disposed about the reduced diameter portion of the hollow shank 9 of the associated push button 8 with the upper end abutting against the shoulder 13 of the shank and the lower end seating on the bottom of the associated recess 5a' so as to normally urge the push button 8 upwardly to thereby cause the movable contact piece 4a (or 4b) to abut against the cathode electrode 6. The lower end of the recess 5a' has a terminal 15 connected thereto and which extends downwardly therefrom so as to be connected to the motor M1 (or M2).

As more clearly shown in FIGS. 5 and 6, each of the movable contact pieces 4a, 4b is in the form of a ring-shaped leaf spring having a substantially triangular cross-section as seen in elevation and is provided with spaced and opposite contacts 16, 16 at the apex.

The second embodiment of the side mirror control of the present invention will be now described referring to FIGS. 7 through 10 inclusive. The second embodiment comprises the components connected together in the circuit as shown in FIG. 7. Also in this embodiment, it is assumed that the motor M1 is connected to the vertical shaft of the vehicular side mirror to rotate the shaft and the motor M2 is connected to the horizontal shaft of the same side mirror to rotate the shaft. Similarly, it is also assumed that each of the switches 1a', 1a' is adapted to rotate the motor M1 (or M2) in the forward direction and each of the switches 1b', 1b' is adapted to rotate the motor M1 or M2 in the reverse direction. Each of the switches 1a', 1a' comprises a stationary contact 2a' connected to the positive side of the power source, a stationary contact 20a connected to one terminal of the motor M1 (or M2) and mating with the stationary contact 2a', a stationary contact 3a' connected to the negative side of the power source, a stationary contact 21a connected to the one terminal of the motor M1 (or M2) and mating with the stationary contact 21a, a movable contact piece 22a adapted to contact the pair of stationary contacts 2a', 20a and a movable contact piece 23a adapted to contact the pair of stationary contacts 3a', 21a. Similarly, each of the switches 1b', 1b' comprises a stationary contact 2b' connected to the positive side of the power source, a stationary contact 20b connected to the other terminal of the motor M1 (or M2) and mating with the stationary contact 2b', a stationary contact 3b' connected to the negative side of the power source, a stationary contact piece 21b connected to the other terminal of the motor M1 (or M2), a movable contact piece 22b adapted to contact the pair of stationary contacts 2b', 20b and a movable contact piece 23b adapted to contact the pair of stationary contacts 3b', 21b.

In the switch 1a' the movable contact piece 22a is normally separated from the pair of stationary contacts 2a', 20a but is caused to contact the stationary contacts 2a', 20a when the switch 1a' is actuated to thereby rotate the motor M1 (or M2) in the forward direction and the movable contact piece 23a is normally in contact with the pair of stationary contacts 3a', 21a, but separated from the stationary contacts 3a', 21a when the switch 1a' is actuated to thereby rotate the motor M1 (or M2) in the forward direction. Similarly, in the switch 1b', the movable contact piece 22b is normally separated from the pair of stationary contacts 2b', 20b, but is caused to contact the stationary contacts 2b', 20b when the switch 1b' is actuated and the movable contact piece 23b is normally in contact with the pair of stationary contacts 3b', 21b, but separated from the stationary contacts 3b', 21b when the switch 1b' is actuated to thereby rotate the motor M1 (or M2) in the reverse direction.

Figure 8:
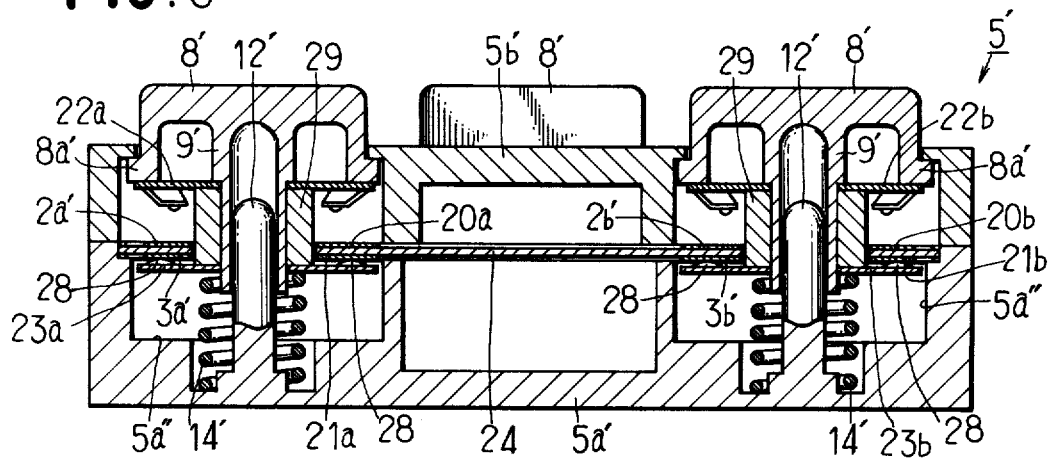
Figure 9:
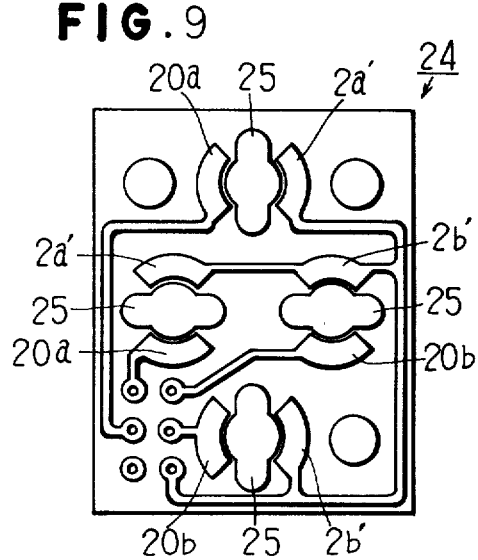
Figure 10:
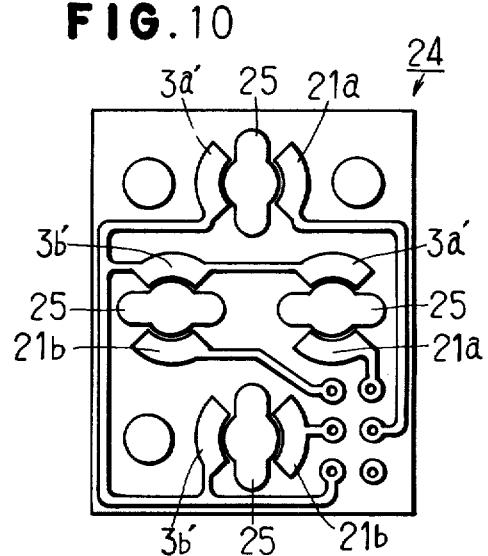

The switches 1a' and 1b' are incorporated into a single casing 5' which comprises a base member 5a' and a cover member 5b' positioned on the top of the base member 5a'. The springs 1a' and 1b' are arranged in the interior of the casing 5' in the manner as shown in FIG. 8. As more clearly shown in FIGS. 9 and 10, the stationary contacts 2a' and 20a of the switches 1a' and the stationary contacts 2b' and 20b of the switches 1b' are printed on one surface or the upper surface of a common printed circuit board 24 and the stationary contacts 3a' and 21a of the switches 1a' and the stationary contacts 3b' and 21b of the switches 1b' are printed on the other surface or underneath surface of the printed circuit board 24. In the same manner as described in connection with the first embodiment, a plurality of spring-loaded push buttons 8', 8' . . . similar to the push buttons 8, 8 . . . of the first embodiment are received in the corresponding bores formed in the casing cover member 5b' in the positions corresponding to those of the switches with the heads projecting above the casing 5' and have outwardly extending flanges 8a' in the peripheries thereof which prevent the push buttons from slipping out of the casing 5'.

Also in the second embodiment, each of the spring-loaded push buttons 8', 8' . . . has a center hollow shank 9' depending downwardly from the inner surface of the head of the associated push button and extending through the corresponding bore 25 formed in the printed circuit board 24 to slidably fit on the guide projection 12' extending uprightly from the upper surface of the casing base member 5a'. The upper surface of the casing member 5a' is also provided with a plurality of recesses 5a" each surrounding the corresponding guide projection 12'. A spring 14' surrounds the portion of the corresponding push button shank 9' positioned within the recess 5a" so as to normally bias the push button 8' upwardly and at the same time urge the corresponding movable piece 23a (or 23b) against the corresponding pair of stationary contacts 3a', 21a (or 3b', 21b). The movable contact pieces 22a and 23a (or 22b and 23b ) are secured to the associated push button shank 9' in vertically spaced positions along the length of the shank. When a selected push button 8' is depressed down against the force of the associated spring 8', the pair of upper movable contact piece 22a (or 22b) is caused to contact the stationary contacts 2a' and 20a (or 2b' and 20b) and the lower movable contact piece 23a (or 23b) is separated from the pair of stationary contacts 3a' and 21a (or 3b' and 21b) to thereby shift the switch 1a' (or 1b') so as to reverse the rotational direction of the motor M1 (or M2).

The upper movable contact pieces 22a and 22b have the same shape as the corresponding parts of the first embodiment as shown in FIGS. 5 and 6 whereas the lower movable contact pieces 23a and 23b are in the form of a flat annular leaf spring. In FIG. 8, reference numeral 29 denotes ring-shaped spacers disposed between the upper and lower movable contact pieces 22a, 23a and 22b, 23b, respectively to maintain the associated upper and lower movable contact pieces in a spaced relationship.

While two embodiments of the invention have been shown and described in detail, it will be understood that the same are for illustration purpose and not to be taken as a definition of the invention, reference being had for this purpose to the appended claims.

What is claimed as new and desired to be secured by Letters Patent of the United States is:

1. A vehicular side mirror control comprising:
   two drive sources rotating a vehicular side mirror in vertical and horizontal directions, respectively,
   forward and reverse drive electric circuits for each of said drive sources,
   a forward drive switch in said forward drive electric circuit for driving the associated drive source in the forward direction and
   a reverse drive switch in said reverse drive electric circuit for driving the associated drive source in the reverse direction, said switches being in the form of a push button-operated switch wherein each of said switches comprises;
   a first pair of positive stationary contacts,
   a first movable contact piece normally separated from said first pair of stationary contacts,
   a second pair of netative stationary contacts, one contact in each of said first and second pairs of stationary contacts being connected to either terminal of the associated drive source,
   a second movable contact piece normally in contact with said second pair of negative stationary contacts and a spring-loaded push button normally urging said second movable contact piece to contact said second pair of stationary contacts and adapted to cause said first movable contact piece to contact said first pair of stationary contacts and separate said second movable contact piece from said second pair of stationary contacts when said push button is depressed down to thereby drive the associated drive source in either direction; and
   a common printed circuit board wherein said first pair of positive contacts are formed on one surface of said common printed circuit board and said second pair of negative stationary contacts are formed on another surface of said common printed circuit board.

2. The vehicular side mirror control as set forth in claim 1, in which said push button has a head, a shank depending from said head and extending through said printed circuit board, said first and second movable contact pieces being mounted on said shank at different positions along the shank, and a spring disposed about said shank normally urging said second movable contact piece against said second pair of stationary contacts and adapted to be overcome when the push button is depressed down to separate the second movable contact piece from the second pair of stationary contacts and cause said first movable contact piece to contact said first pair of stationary contacts to thereby drive the associated drive source in either one direction.

3. The vehicular side mirror control as set forth in claim 2, further including a ring-shaped spacer disposed about said shank of the push button between said first and second movable contact pieces to maintain the movable contact pieces in a spaced relationship.

* * * * *